United States Patent [19]

Spethmann

[11] 4,214,626
[45] Jul. 29, 1980

[54] REJECTED HEAT AIR CONDITIONING CONTROL SYSTEM

[75] Inventor: Donald H. Spethmann, Arlington Heights, Ill.

[73] Assignee: Honeywell Inc., Minneapolis, Minn.

[21] Appl. No.: 939,513

[22] Filed: Sep. 5, 1978

[51] Int. Cl.[2] .............................................. F25B 29/00
[52] U.S. Cl. ........................................ 165/29; 62/181
[58] Field of Search ............... 62/181, 238 E, 324 D; 165/29

[56] References Cited

U.S. PATENT DOCUMENTS 3,636,721  1/1972  Rex ........................................... 62/98

OTHER PUBLICATIONS

*Control Systems for Heating, Ventilating and Air Conditioning*, Haines, Roger W. Van Nostrand Reinhold Co., 1971, pp. 178–181.

*Primary Examiner*—Albert W. Davis
*Assistant Examiner*—Margaret A. Focarino
*Attorney, Agent, or Firm*—Trevor B. Joike

[57] ABSTRACT

An air conditioning control system is disclosed for controlling a refrigeration unit located in a building which has both interior zones and exterior zones, the refrigeration unit being capable of supplying both chilled water for cooling and hot water for heating. The hot water temperature is controlled by first controlling the amount of heat rejected by a cooling tower, then by controlling the position of an outdoor air damper as a source of free cooling, then by overriding both the chilled water and hot water temperature controllers and finally by controlling the amount of fuel heat supplied to the hot water. The chilled water temperature controller is overridden to lower the chilled water temperature thus increasing the rejected heat from the refrigeration unit. The hot water temperature controller is overridden to increase the rejected heat supplied by the refrigeration unit.

44 Claims, 10 Drawing Figures

$$\text{OUTPUT \%} = \frac{T3 - (S.P. - \frac{TR}{2})}{TR} \times 100$$

$$\begin{pmatrix} \text{NEG } \# = 0\% \\ \# \text{ OVER } 100\% = 100\% \end{pmatrix}$$

CONTROL ERROR SIGNAL

REJECTED HEAT AIR CONDITIONING CONTROL SYSTEM

BACKGROUND OF THE INVENTION

This invention relates to an air conditioning control system for controlling the cooling and heating of interior and exterior zones of a building, and more particularly to the control of the rejected heat produced by a refrigeration unit located in the building.

In a typical large commercial building having outer offices or areas which have at least one wall exposed to the outdoors and inner offices or areas which have no walls exposed to the outdoors, the interior offices or areas are termed "interior zones" and the outside offices or areas are termed "exterior zones." Such a building normally has an air conditioning system which is capable of delivering cool air by way of interior delivery systems and heated air by way of exterior delivery systems. The interior zones of the building are cooling loads during both winter and summer operation, whereas the exterior zones are heating loads during winter operation and cooling loads during summer operation.

The refrigerating unit in such a building normally comprises a condensor, a compressor and an evaporator. The evaporator chills air conditioning water which is then supplied to, for example, a cooling coil located within the ducts making up the interior delivery system. A fan in the delivery system forces air within the ducts over the cooling coil to lower the temperature of the air and which is then supplied to the zones connected to the ducts. Such air conditioning systems can also include a cooling tower which is located outdoors and through which water circulating through the condensor is passed. Fans in the cooling tower blow air across the water to reject the heat in the water from the building. The air conditioning system may also include a source of fuel heat for heating hot water which is supplied to heating coils located within the duct system. The heating coil then heats air passed over the heating coil by a fan located in the duct. This heated air is then supplied to zones connected to this system of ducts.

The interior zones will all be connected to the cold air ducts whereas the exterior zones are connected to both the cold air ducts and hot air ducts. It has been known in prior art systems to use the rejected heat from the condenser of the refrigerating unit to heat the hot water supplied to the heating coils in the hot air ducts. However, no system has been heretofore disclosed for modulating the chilled water temperature supplied by the evaporator to force the refrigerating unit to produce more rejected heat as a cheaper source of heat than fuel heat.

SUMMARY OF THE INVENTION

The present invention provides an air conditioning control system for controlling the refrigeration unit and heating unit in a building to control the amount of rejected heat from the refrigeration unit in order to forestall the use of fuel heat. The air conditioning control system includes a chilled water controller for controlling the temperature of the chilled water, a hot water controller for controlling the temperature of the hot water and an override system for overriding either the chilled water controller, the hot water controller or both for forcing the refrigeration unit to produce additional rejected heat before it is necessary to use fuel heat to heat the hot water.

The chilled water controller may comprise a plurality of temperature sensors, each located in different zones supplied with chilled air, and a greatest demand selector for controlling the chilled water temperature at a temperature sufficient to satisfy the zone having the greatest cooling demand. Likewise, the hot water controller may comprise a plurality of thermostats each located in different zones supplied by the heating ducts and a greatest demand selector for controlling the hot water temperature at a temperature to satisfy the zone having the greatest heating demand.

BRIEF DESCRIPTION OF THE DRAWINGS

These and other features and advantages will become apparent from a detailed consideration of the invention when taken in conjunction with the drawings in which.

DETAILED DESCRIPTION

In those commercial buildings which have both interior zones and exterior zones, cold deck systems are used to supply cold air to both the interior zones and the exterior zones whereas hot duct systems are used to supply hot air to typically only the exterior zones. In the air conditioning system 10 shown in FIG. 1 an interior system 11 is shown for delivering cold air to the zones connected thereto. Interior system 11 comprises a return air duct 12 for returning air from the zones. The return air is either exhausted through exhaust damper 13 located in exhaust air duct 14 or supplied to mixing chamber 15 through return air damper 16. The return air through damper 16 is mixed with outdoor air supplied through an outdoor air damper 17 located in outdoor air duct 20. The mixed air in mixing chamber 15 is then driven by fan 21 through a cooling coil 22 located in discharge air duct 23. Thermostat 25 is located in the condition spaces to sense the temperature of the zones connected to interior system 11.

Figure 1:
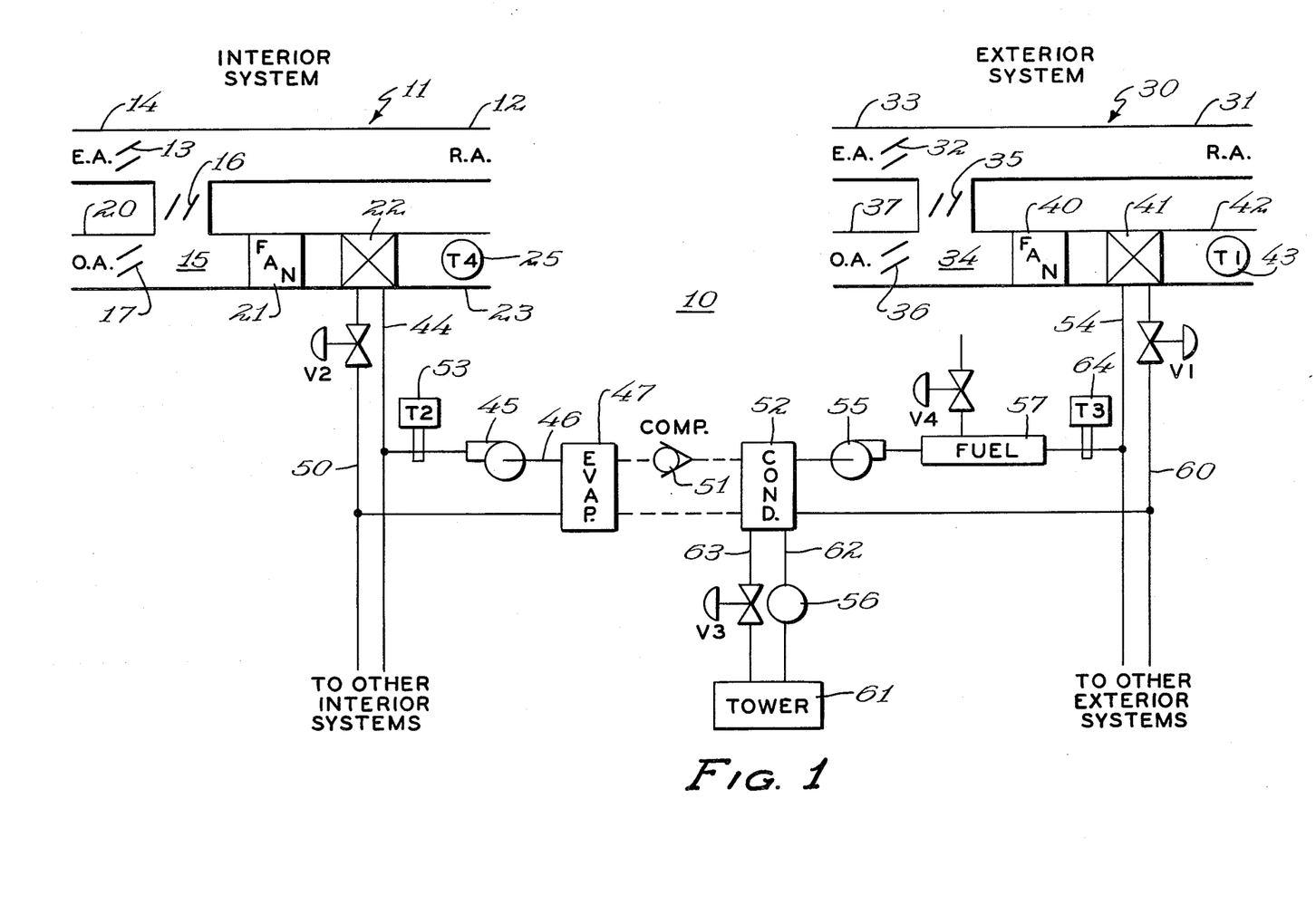
FIG. 1 shows the refrigeration and heating system for the interior and exterior systems of a building.

Exterior system 30 comprises a return air duct 31 for returning air from the zones connected to exterior system 30. The return air is either exhausted through exhaust air damper 32 located in exhaust air duct 33 or supplied to mixing chamber 34 through return air damper 35. The return air in mixing chamber 34 is mixed with outdoor air supplied through outdoor air damper 36 located in outdoor air duct 37. The mixture of outdoor air and return air in mixing chamber 34 is driven by fan 40 through a heating coil 41 located in discharge air duct 42 and then to the zones connected to exterior system 30. Thermostat 43 is located in the condition spaces to sense the temperature of the zones connected to exterior system 30.

Cooling coil 22 is supplied with chilled water through supply conduit 44 and is circulated through supply conduit 44 by a pump 45 located in the outlet line 46 of an evaporator 47. The water is returned from cooling coil 22 through a return conduit 50. A valve V2 is located between the evaporator and cooling coil 22 in return line 50 to modulate the amount of chilled water supplied to cooling coil 22. The refrigerating unit for the air conditioning system 10 is comprised of evaporator 47, compressor 51 and condensor 52. A refrigerant is circulated between the evaporator and the condensor by compressor 51 to chill the water supplied by evaporator 47 to cooling coil 22. As shown, the evaporator 47 also supplies chilled water to the other interior systems in the building. Thermostat 53 senses the chilled water temperature of the chilled water supplied by the evaporator 47.

Heating coil 41 is supplied with hot water by hot water supply conduit 54. Hot water is circulated through the condensor by a pump 55 connected to condensor 52 and then through a source of fuel heat 57 to supply conduit 54. Hot water is returned to condensor 52 by return conduit 60. Valve V1 is located between heating coil 41 and condensor 52 in return line 60 for modulating the amount of hot water circulated through heating coil 41. Thermostat 64 senses the temperature of the hot water supplied to the heating coil 41. The hot water lines are also connected to other exterior systems. Valve V4 modulates the fuel supplied to the source of fuel heat 57. The hot water is circulated through condensor 52 to take advantage of the rejected heat from the refrigerating unit.

Condensor 52 is also connected to a cooling tower 61 by way of conduits 62 and 63. A valve V3 in conduit 63 modulates the amount of water supplied from condensor 52 to cooling tower 61 by pump 56. Thus, a portion of the rejected heat from condenser 52 can be rejected from the building by cooling tower 61.

Figure 2:
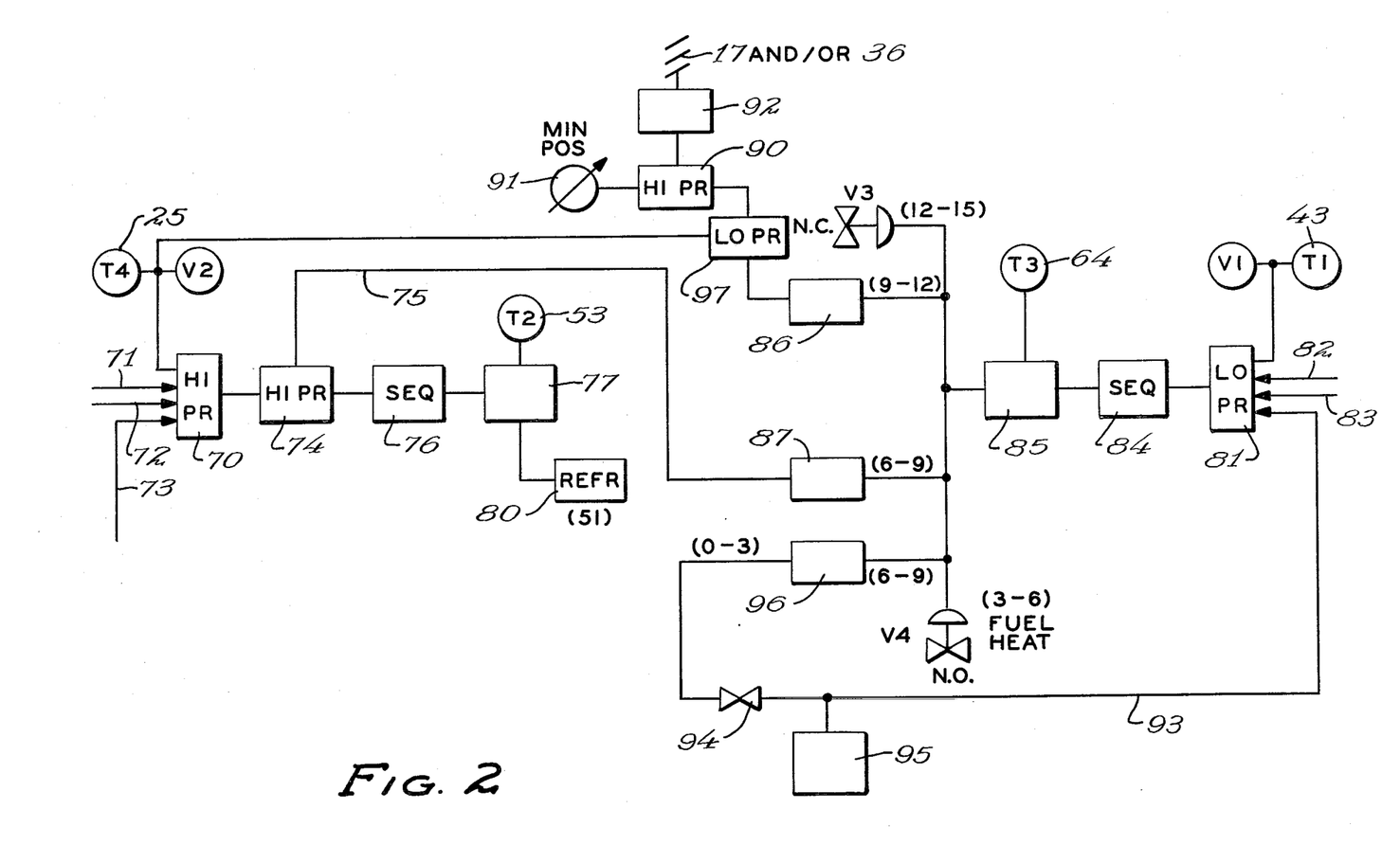
FIG. 2 shows the control system for controlling the refrigeration and heating unit of FIG. 1.
Figure 4:
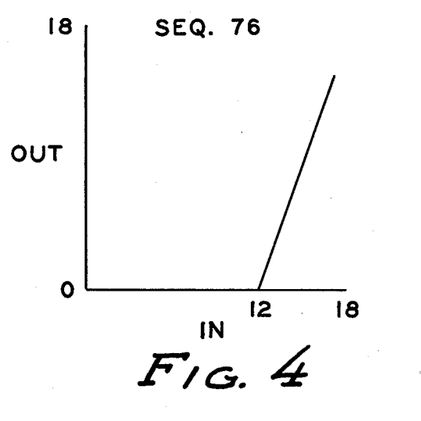
FIG. 4 is a graph showing the operation of the sequencer 76 of FIG. 2.
Figure 5:
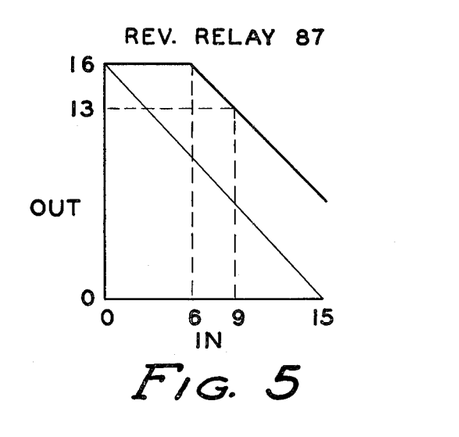
FIG. 5 is a graph showing the operation of the reset limit controller 87 on the heating side of the control system shown in FIG. 2.

FIG. 2 shows the manner in which the T1-T4 thermostats 43, 53, 64 and 25 and valves V1, V2, V3 and V4 are used to provide the control functions for the air conditioning control system of FIG. 1. The system of FIG. 2 is shown, for purposes of explanation, as a pneumatic control arrangement. Thermostat 25 is connected to valve V2 to modulate the amount of cold water supplied to cooling coil 22 based upon demand and, in the case where thermostat 25 is a direct acting thermostat, is also connected to a high pressure selector 70. High pressure selector 70 is also connected to lines 71, 72 and 73 which may be connected to corresponding thermostats located in zones of other interior systems within the building. The output from high pressure selector 70 will be the greatest of the input pressures representing the interior system having the greatest cooling demand and is connected to one input of high pressure selector 74, the other input of which is connected to line 75. High pressure selector 74 selects the higher of the pressures from high pressure selector 70 or from input line 75 and connects this higher pressure to sequencer relay 76. High pressure selectors 70 and 74 may be similar to the high pressure selector shown in U.S. Pat. No. 3,602,427. Sequencer 76 may be the same as the Honeywell pneumatic ratio relay RP971A which may have an adjustable input versus output response such as that shown in FIG. 4. Sequencer 76 characterizes the output pressure from high pressure selector 74 for use as an input pressure to chilled water temperature controller 77. Chilled water temperature controller 77 may be a Honeywell RP908. The output from sequencer 76 is connected to the control point port of controller 77 and thermostat 53, which is shown in FIG. 1 sensing the temperature of the water supplied by pump 45, is connected to the input port of controller 77. The output from controller 77 is connected to refrigeration unit 80 which may be the compressor 51 in FIG. 1 (for example, the inlet vane of a centrifugal chiller).

Figure 10:
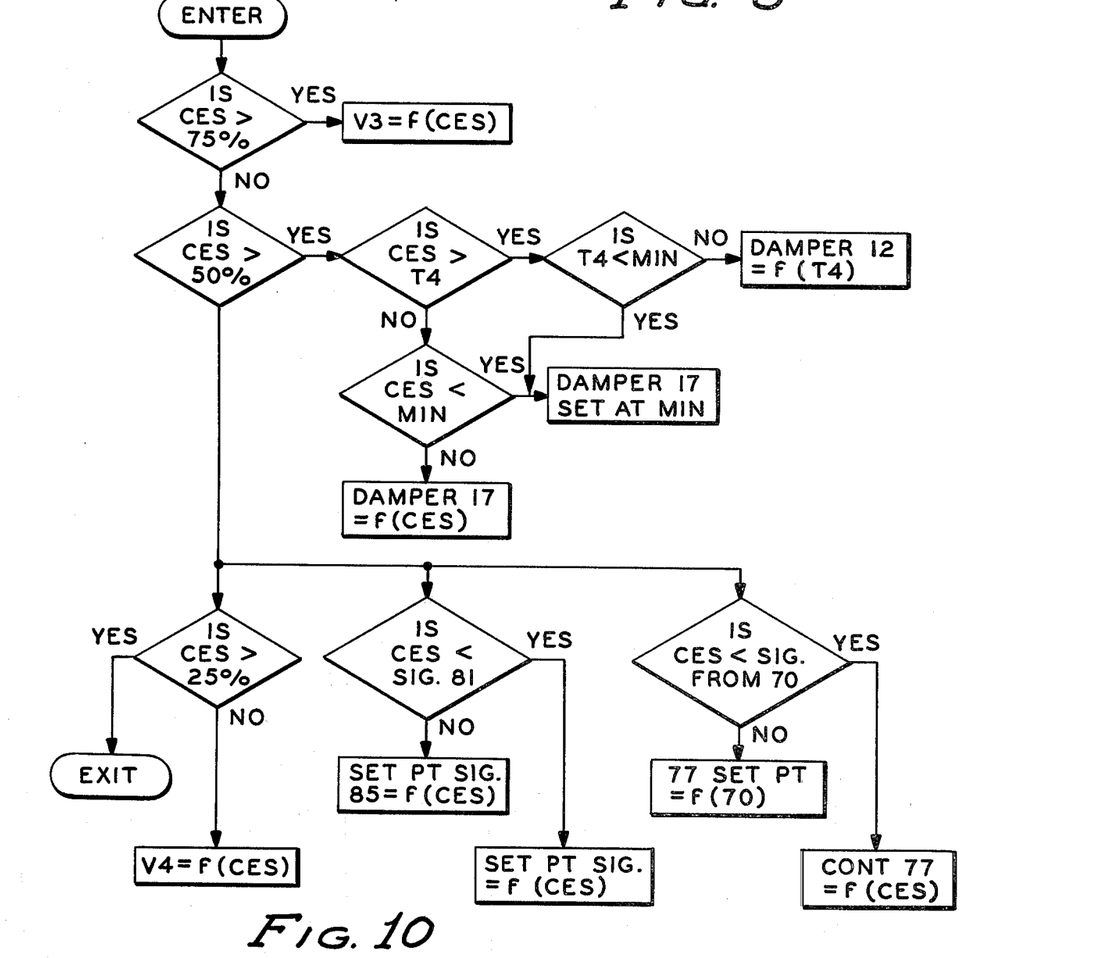

The system which is the warmest and requires the most cooling will provide the highest pressure to highest pressure selector 70. Highest pressure selector 70 will pass this highest pressure through to highest pressure selector 74. As long as this input pressure is higher than the override pressure in line 75, the pressure from selector 70 is connected to sequencer 76 which modifies the pressure signal to provide a set point for controller 77. If the temperature of the chilled water varies from the set point temperature, the compressor 51 in FIG. 10 is controlled to bring the temperature of the chilled water back to the set point as established by the output pressure from sequencer 76. In this manner, the chilled water temperature is controlled at a temperature which will satisfy the thermostat experiencing the greatest cooling need or, in other words, the greatest demand. The valve V2 associated with the thermostat having the greatest demand, will be wide open whereas the other thermostats will be at some position between fully open and fully closed as determined by the temperature sensed within the particular interior system.

Figure 6:
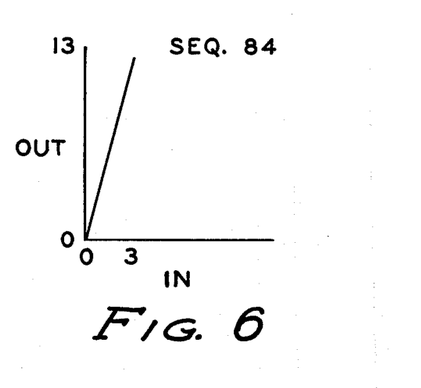
FIG. 6 is a graph showing the operation of the sequencer 84 on the heating side of the control system shown in FIG. 2.

The hot water side of the circuit shown in FIG. 2 performs the same basic greatest demand function. In this regard, thermostat 43 is connected to valve V1 shown in FIG. 1. Since thermostat 43 may be a direct acting thermostat, the lower the temperature sensed by thermostat 43, the lower its output pressure. The lowest output pressure from any of the thermostats located in their corresponding exterior systems and connected to the hot water side of the circuit shown in FIG. 2 will represent the coolest system and, therefore, the system which requires the most heating. Thus, in order to provide a signal which is indicative of the system having the greatest heating demand, thermostat 43 is connected to lowest pressure selector 81 which is also connected to other thermostats located in heating zones by lines 82 and 83. The output from lowest pressure selector 81 is connected to sequencer 84 which may be an RP971 ratio relay manufactured and sold by Honeywell Inc. In this case, the sequencer 84 is adjusted to provide the output curve shown in FIG. 6. Lowest pressure selector 81 may be similar to that shown in U.S. Pat. No. 3,638,857. The output from sequencer 84 is connected to the control point input of hot water temperature controller 85 the input of which is connected to thermostat 64 which is shown in FIG. 1 sensing the hot water temperature. When the output from thermostat 64 is equal to the output from sequencer 84, the output pressure from hot water temperature controller 85 is arranged to be, for example, 9 psi.

The output from controller 85 is connected to valve V3 (shown in FIG. 1), to the input of a sequencing relay 86, which may be an RP971 manufactured by Honeywell Inc., to the input of reversing relay 87, which may be an RP972 manufactured by Honeywell Inc. to the input of sequencing relay, 96 which also may be an RP971, and to valve V4 shown in FIG. 1.

Figure 3:
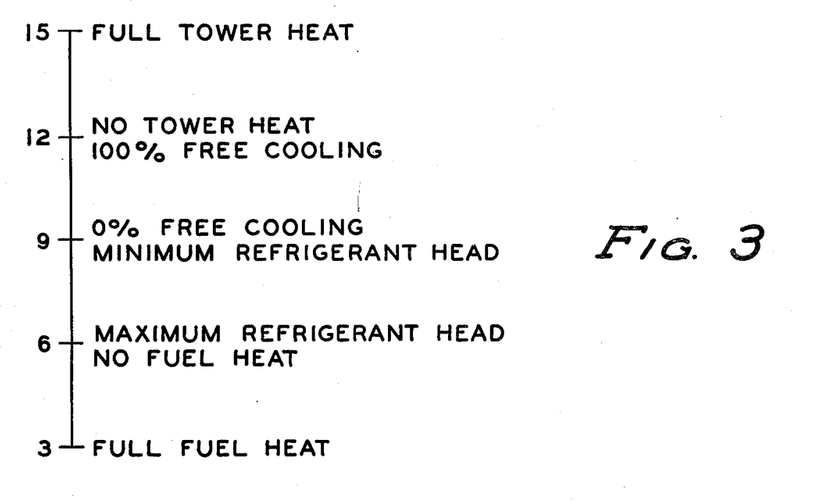
FIG. 3 shows the sequence of operation of the control system of FIG. 2.
Figure 7:
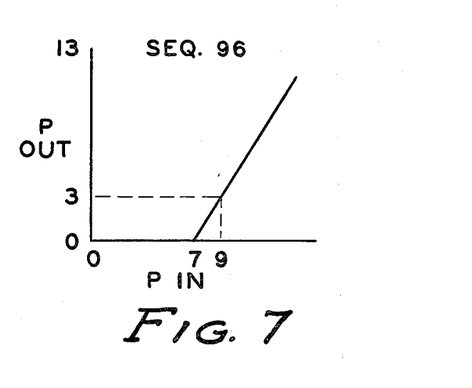
FIG. 7 is a graph showing the operation of sequencing relay 96.

Valve V3 is arranged to be fully open at 15 psi and fully closed at 12 psi. Sequencing relay 86 is arranged to provide an appropriate output pressure to low pressure selector 97 which compares the cooling signal from thermostat 25 to the override signal from relay 86. The lowest of these is routed to high pressure selector 90 which may be similar to the highest pressure selector shown in the above mentioned U.S. Pat. No. 3,602,427. Highest pressure selector 90 compares the output from low pressure selector 97 to a minimum position pressure source 91 and the highest of these two pressures is used to control damper motor 92 which positions damper 17 and/or 36 as shown in FIG. 1. Minimum position source 91 establishes a minimum position for these dampers beyond which they may not be closed. Sequencing relay 86 is arranged so that these dampers are fully opened at 12 psi input to sequencer 86 and closed to their minimum position at 9 psi input to sequencer 86. Reversing relay 87 is arranged to provide a 16 psi output when its input is 6 psi and a 13 psi output when its input is 9 psi. The output from reversing relay 87 is connected by line 75 to one input of highest pressure selector 74 and is used to override the chilled water. The output of controller 85 is also connected through sequencer 96, having an operation as shown in FIG. 7, and restriction 94 and time delay 95 over line 93 to override the hot water control. Valve V4 is arranged so that it is fully closed at 6 psi in and fully open at 3 psi. The sequence of operation is shown in connection with FIG. 3.

The thermostats T1 located in the exterior systems will control their respective valves to control the temperature of the air within those systems. The greatest demand T1 thermostat 43 will reset the control point of controller 85 through sequencer relay 84. As the space temperature sensed by T1 decreases, the control point will increase. The supply water temperature setpoint sensed by T3 thermostat 64 will balance out at the temperature level necessary to satisfy T1 thermostat 43. The control action of controller 85 is to increase its output pressure proportional to the amount that the hot water supply temperature sensed by T3 is above the setpoint established by the input from sequence relay 84. The control action of controller 85 occurs as the availability and use of rejected heat changes with the total building load. When the quantity of rejected heat equals the heating requirements, the control action will stabilize at 12 psi from controller 85 which closes valve V3 to reject no heat and allows full use of free cooling controlled by thermostat T4 controlling damper motor 92 through low pressure selector 97 and high pressure selector 90. When available heat is greater than the heat requirement, the temperature will increase at T3 and the control action of controller 85 will stabilize at a pressure between 12 and 15 psi. This condition rejects the surplus heat through the cooling tower. When the heat requirements rise above the normally available heat, the temperature will decrease at T3 and the control action of controller 85 will stabilize at a pressure lower than 12 psi. This reduces the amount of free cooling that can be done by the fan system which causes more refrigerated cooling and thus produces more available heat. This action is accomplished by decreasing the pressure from relay 86 to override the T4 control sequence in low pressure selector 97, and closing damper 17 by motor 92 through high pressure selector 90. If there is enough heat available from this source the control action will stabilize between 9 and 12 psi. If there is not enough heat from this source, the controller 85 output will drop below 9 psi resetting chilled water controller 77 down through sequence relay 87 and high pressure selector 74 and sequence relay 76. If there is a sustained high heating load, the setpoint of hot water controller 85 is slowly raised by sequence relay 96 acting through restriction 94, capacity tank 95, line 93, low pressure selector 81 and sequence relay 84. The result of low chilled water and high condensor water temperatures is to increase the refrigerant compressor pumping heat requiring more electrical power input causing more rejected heat to be available for heating. If this added quantity of heat is sufficient to meet the needs, the hot water controller 85 output will stabilize between 6 and 9 psi. If the rejected heat available with all cooling done at maximum refrigerant head is not sufficient to meet the requirements, the supply hot water controller 85 output will go below 6 psi and valve V4 will be opened to add fuel heat as necessary. The controller 85 output will stabilize between 3 and 6 psi.

Thus, the hot water temperature is controlled at a point to satisfy the zone having the greatest heating demand or at a maximum temperature to get maximum rejected heat. When the rejected heat supplied by the condensor of FIG. 1 is not required to maintain the hot water temperature at a point to satisfy the exterior system having the greatest demand, outdoor air is admitted into the building controlled by thermostat 25 from a minimum amount to a maximum amount at which point, if the rejected heat is still too much, the heat from the condensor is rejected from the building by the cooling tower. On the other hand, if after no rejected heat is rejected from the building by the cooling tower and minimum outdoor air is being admitted into the building, the amount of rejected heat from the refrigeration unit at minimum design head is still insufficient to maintain the hot water temperature at a point to satisfy the exterior system having the greatest demand, the refrigerant head is increased to increase the rejected heat from the condensor. If the maximum refrigerant head across the refrigerating unit is insufficient to produce the necessary rejected heat to maintain the hot water temperature at the desired point, fuel heat is then added to the system.

Figure 8:
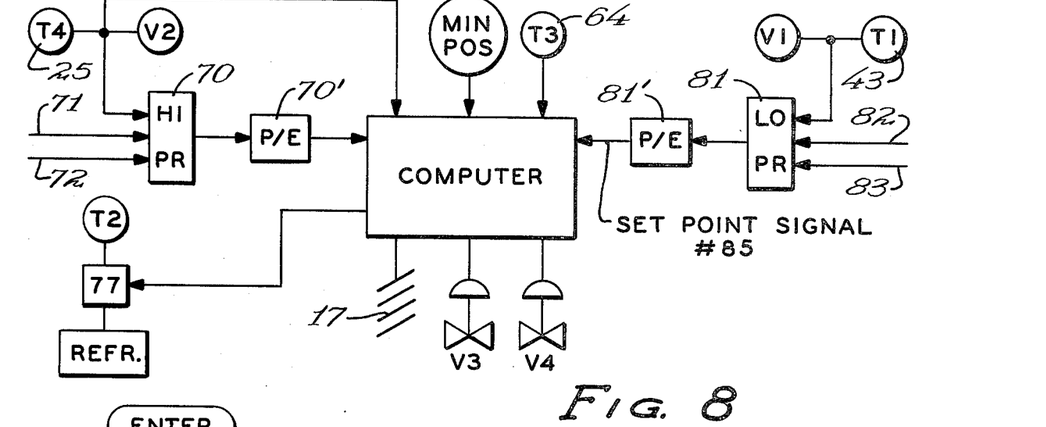
FIG. 8 is a generalized block diagram of a computer system which may perform the functions of the system shown and described in FIGS. 1–7.
Figure 9:
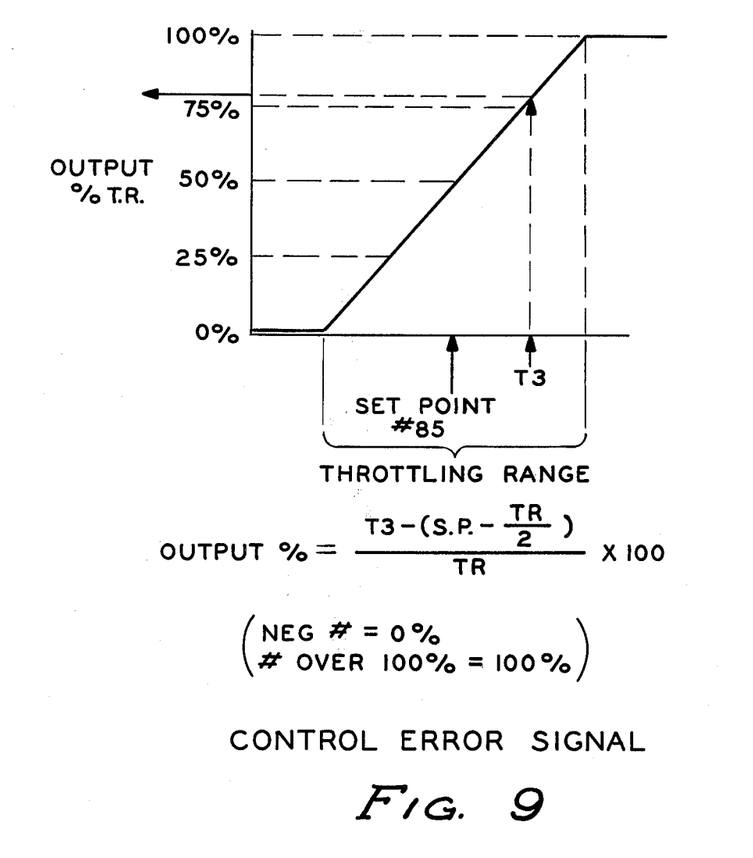
FIG. 9 shows how the control error signal used in the flow chart of FIG. 10 is computed; and, FIG. 10 is a flow chart of a program which can be used in the computer to control the system of FIG. 8.

The control functions described above with respect to the hardware system shown in FIGS. 1-7 can also be accomplished by a computer controlled system such as that shown in FIG. 8. In FIG. 8, the input parameter T3, representing the hot water temperature, is compared to the set point signal 85 derived from the lowest pressure selector 81 and the pressure to electric transducer 81' which may be a Honeywell RP7505. The use of a programmed constant throttling range as well as the input variables derived from circuits 70' and 81' and sensor 64 can be used to produce a control error signal (CES) as shown in FIG. 9.

This control error signal is used in the program as shown by the flow chart of FIG. 10 to control the system of FIG. 8. Specifically, if the control error signal is greater than 75%, the cooling tower valve V4 is controlled as a function of the control error signal. Assuming that the control error signal is not greater than 75% but is greater than 50%, if the control error signal is not greater than the temperature sensed by T4 and is less than the minimum value as established by the minimum position control 91, damper 17 will be adjusted to its minimum position. However, if the control error signal is not greater than T4 but the control error signal is greater than the minimum value established by circuit 91, damper 17 is controlled as a function of the control error signal. If, on the other hand, the control error signal is greater than T4, the damper 17 is to be set to its minimum position if T4 is less than the minimum value established by circuit 91 or will be set as a function of T4 if T4 is greater than this minimum value.

If the control error signal is not greater than 50% two operations take place. First, set point signal 85 in the calculation of FIG. 9 is slowly increased to a maximum set point. Second, if the control error signal is less than the signal derived from high pressure selector 70, then controller 77 CPA is controlled as the function of the control error signal; however, if the control error signal is greater than the signal derived from high pressure selector 70, controller 77 CPA is controlled as the function of the output from higher pressure selector 70. If the control error signal is less than 25%, the auxiliary heat fuel valve V4 is controlled as the function of the control error signal.

The embodiments of the invention in which an exclusive property or right is claimed are defined as follows:

1. A control for the air conditioning system of a building, said air conditioning system having both interior systems for the delivery of conditioned air to interior zones within said building and exterior systems for the delivery of conditioned air to exterior zones of said building, said air conditioning system including an evaporator for supplying chilled water to at least said interior systems, a condensor for supplying hot water to at least said exterior systems, and a compressor connected between said evaporator and said condensor, a cooling tower connected to said condensor, at least one outdoor air damper associated with said interior and exterior systems, and a source of fuel heat for heating said hot water supplied to said exterior systems by said condensor, said control system comprising:

first temperature sensing means for supplying a first output signal dependent upon the temperature of the air within at least one interior system;

first control means, connected to said first temperature sensing means and responsive to said first output signal, adapted to control the temperature of said chilled water in accordance with the temperature sensed by said first temperature sensing means in said at least one interior system, said first control means including an override means;

second temperature sensing means for sensing the temperature of air within at least one exterior system;

second control means connected to said second temperature sensing means for producing a second output signal;

third control means responsive to a first level of said second output signal for fully rejecting heat from said condensor through said cooling tower and to a second level of said second output signal for rejecting minimum heat through said cooling tower;

fourth control means responsive to said second output signal between a third level and a fourth level for providing a signal connected to said override means to override said first output signal to control the temperature of said chilled water to modulate rejected heat from said condensor; and fifth control means responsive to said fourth level of said second output signal for supplying minimum fuel heat to said hot water and to a fifth level of said output signal for supplying maximum fuel heat to said hot water, wherein said third level falls between said fourth level and said second level.

2. The control of claim 1 wherein said first temperature sensing means comprises a plurality of temperature sensors, each for sensing the temperature within a corresponding interior system, and greatest demand selector means for generating said first output signal dependent upon the interior system having the greatest demand.

3. The control of claim 2 wherein said override means of said first control means comprises a signal selector for selecting between said first output signal and said signal provided by said fourth control means dependent upon their relative magnitudes.

4. The control of claim 3 wherein said second temperature sensing means comprises a plurality of temperature sensors, each for sensing the temperature within a corresponding exterior system, and greatest demand selector means for generating a greatest demand signal dependent upon the exterior system which requires the greatest heating, said second control means being responsive to said greatest demand signal for generating said second output signal.

5. The control of claim 4 wherein said third control means comprises a valve for controlling circulating fluid between said condensor and said cooling tower.

6. The control of claim 5 wherein said fifth control means comprises a valve for controlling the supply of fuel to heat said hot water.

7. The control of claim 6 wherein said fourth control means comprises a reversing relay for receiving said second output signal and for generating an override signal to said override means.

8. The control of claim 1 further comprising sixth control means responsive to said second level of said second output signal for controlling said damper at a maximum position and responsive to said third level of said second output signal for controlling said damper at a minimum position.

9. The control of claim 8 wherein said first temperature sensing means comprises a plurality of temperature sensors, each for sensing the temperature within a corresponding interior system, and greatest demand selector means for generating said first output signal dependent upon the interior system having the greatest demand.

10. The control of claim 9 wherein said override means of said first control means comprises a signal selector for selecting between said first output signal and said signal provided by said fourth control means dependent upon their relative magnitudes.

11. The control of claim 10 wherein said second temperature sensing means comprises a plurality of temperature sensors, each for sensing the temperature within a corresponding exterior system, and greatest demand selector means for generating a greatest demand signal dependent upon the exterior system which requires the greatest heating, said second control means being responsive to said greatest demand signal for generating said second output signal.

12. The control of claim 11 wherein said third control means comprises a valve for controlling circulating fluid between said condensor and said cooling tower.

13. The control of claim 12 wherein said fifth control means comprises a valve for controlling the supply of fuel to heat said hot water.

14. The control of claim 6 wherein said fourth control means comprises a reversing relay for receiving said second output signal and for generating an override signal to said override means.

15. A control for the air conditioning system of a building, said air conditioning system having both interior systems for the delivery of conditioned air to interior zones within said building and exterior systems for the delivery of conditioned air to exterior zones of said building, said air conditioning system including an evaporator for supplying chilled water to at least said interior systems, a condensor for supplying hot water to at least said exterior systems, and a compressor connected between said evaporator and said condensor, a cooling tower connected to said condensor, at least one outdoor air damper associated with said interior and exterior systems, and a source of fuel heat for heating said hot water supplied to said exterior systems by said condenser, said control comprising:

first temperature sensing means for supplying a first output signal dependent upon the temperature of the air within at least one interior system;

first control means, connected to said first temperature sensing means and responsive to said first output signal, adapted to control the temperature of said chilled water in accordance with the temperature sensed by said first temperature sensing means in said at least one interior system;

second temperature sensing means for sensing the temperature of air within at least one exterior system, said second temperature sensing means including an override means;

second control means connected to said second temperature sensing means for providing a second output signal;

third control means responsive to a first level of said second output signal for fully rejecting heat from said condensor through said cooling tower and to a second level of said second output signal for rejecting minimum heat through said cooling tower;

fourth control means responsive to said second output signal between a third level and a fourth level for providing a signal connected to said override means to assume control of the temperature of said hot water; and, fifth control means responsive to said fourth level of said second output signal for supplying minimum fuel heat to said hot water and to a fifth level of said output signal for supplying maximum fuel heat to said hot water, wherein said third level falls between said fourth level and said second level.

16. The control of claim 15 wherein said first temperature sensing means comprises a plurality of temperature sensors, each for sensing the temperature within a corresponding interior system, and greatest demand selector means for generating said first output signal dependent upon the interior system having the greatest demand.

17. The control of claim 16 wherein said second temperature sensing means comprises a plurality of temperature sensors, each for sensing the temperature within a corresponding exterior system, and greatest demand selector means for generating a greatest demand signal dependent upon the exterior system which requires the greatest heating, said second control means being responsive to said greatest demand signal for generating said second output signal.

18. The control of claim 17 wherein said override means comprises an input to said greatest demand selector means of said second temperature sensing means connected to said fourth control means for selecting between said greatest demand signal and said signal provided by said fourth control means dependent upon their relative magnitudes.

19. The control of claim 18 wherein said third control means comprises a valve for controlling circulating fluid between said condensor and said cooling tower.

20. The control of claim 19 wherein said fifth control means comprises a valve for controlling the supply of fuel to heat said hot water.

21. The control of claim 20 wherein said fourth control means comprises a reversing relay for receiving said second output signal and for generating an override signal to said override means.

22. The control of claim 15 further comprising sixth control means responsive to said second level of said second output signal for controlling said damper at a maximum position and responsive to said third level of said second output signal for controlling said damper at a minimum position.

23. The control of claim 22 wherein said first temperature sensing means comprises a plurality of temperature sensors, each for sensing the temperature within a corresponding interior system, and greatest demand selector means for generating said first output signal dependent upon the interior system having the greatest demand.

24. The control of claim 23 wherein said second temperature sensing means comprises a plurality of temperature sensors, each for sensing the temperature within a corresponding exterior system, and greatest demand selector means for generating a greatest demand signal dependent upon the exterior system which requires the greatest heating, said second control means being responsive to said greatest demand signal for generating said second output signal.

25. The control of claim 24 wherein said override means comprises an input to said greatest demand selector means of said second temperature sensing means connected to said fourth control means for selecting between said greatest demand signal and said signal provided by said fourth control means dependent upon their relative magnitudes.

26. The control of claim 25 wherein said third control means comprises a valve for controlling circulating fluid between said condensor and said cooling tower.

27. The control of claim 26 wherein said fifth control means comprises a valve for controlling the supply of fuel to heat said hot water.

28. The control of claim 27 wherein said fourth control means comprises a reversing relay for receiving said second output signal and for generating an override signal to said override means.

29. A control for the air conditioning system of a building, said air conditioning system having both interior systems for the delivery of conditioned air to interior zones within said building and exterior systems for the delivery of conditioned air to exterior zones of said building, said air conditioning system including an evaporator for supplying chilled water to at least said interior systems, a condenser for supplying hot water to at least said exterior systems, and a compressor connected between said evaporator and said condenser, a cooling tower connected to said condenser, at least one outdoor air damper associated with said interior and exterior systems, and a source of fuel heat for heating said hot water supplied to said exterior systems by said condensor, said control system comprising:

first temperature sensing means for supplying a first output signal dependent upon the temperature of the air within at least one interior system;

first control means, connected to said first temperature sensing means and responsive to said first output signal, adapted to control the temperature of said chilled water in accordance with the temperature sensed by said first temperature sensing means in said at least one interior system; said first control means including a first override means;

second temperature sensing means for sensing the temperature of air within at least one exterior system; said second temperature sensing means including a second override means;

second control means connected to said second temperature sensing means for producing a second output signal;

third control means responsive to a first level of said second output signal for fully rejecting heat from said condensor through said cooling tower and to a second level of said second output signal for rejecting minimum heat through said cooling tower;

fourth control means responsive to said second output signal between a third level and a fourth level for providing a signal connected to said first and second override means to override said first output signal to control the temperature of said chilled water and to assume control of the temperature of said hot water; and,     fifth control means responsive to said fourth level of said second output signal for supplying minimum fuel heat to said hot water and to a fifth level of said output signal for supplying maximum fuel heat to said hot water,     wherein said third level falls between said fourth level and said second level.

30. The control of claim 29 wherein said first temperature sensing means comprises a plurality of temperature sensors, each for sensing the temperature within a corresponding interior system, and greatest demand selector means for generating said first output signal dependent upon the interior system having the greatest demand.

31. The control of claim 30 wherein said first override means comprises a signal selector for selecting between said first output signal and said signal provided by said fourth control means dependent upon their relative magnitudes.

32. The control of claim 31 wherein said second temperature sensing means comprises a plurality of temperature sensors, each for sensing the temperature within a corresponding exterior system, and greatest demand selector means for generating a greatest demand signal dependent upon the exterior system which requires the greatest heating, said second control means being responsive to said greatest demand signal for generating said second output signal.

33. The control of claim 32 wherein said second override means comprises an input to said greatest demand selector means of said second temperature sensing means connected to said fourth control means for selecting between said greatest demand signal and said signal from said fourth control means dependent upon their relative magnitudes.

34. The control of claim 33 wherein said third control means comprises a valve for controlling circulating fluid between said condensor and said cooling tower.

35. The control of claim 34 wherein said fifth control means comprises a valve for controlling the supply of fuel to heat said hot water.

36. The control of claim 35 wherein said fourth control means comprises a reversing relay for receiving said second output signal and for generating an override signal to said first and second override means.

37. The control of claim 29 further comprising sixth control means responsive to said second level of said second output signal for controlling said damper at a maximum position and responsive to said third level of said second output signal for controlling said damper at a minimum position.

38. The control of claim 37 wherein said first temperature sensing means comprises a plurality of temperature sensors, each for sensing the temperature within a corresponding interior system, and greatest demand selector means for generating said first output signal dependent upon the interior system having the greatest demand.

39. The control of claim 38 wherein said first override means comprises a signal selector for selecting between said first output signal and said signal provided by said fourth control means dependent upon their relative magnitudes.

40. The control of claim 39 wherein said second temperature sensing means comprises a plurality of temperature sensors, each for sensing the temperature within a corresponding exterior system, and greatest demand selector means for generating a greatest demand signal dependent upon the exterior system which requires the greatest heating, said second control means being responsive to said greatest demand signal for generating said second output signal.

41. The control of claim 40 wherein said second override means comprises an input to said greatest demand selector means of said second temperature sensing means connected to said fourth control means for selecting between said greatest demand signal and said signal from said fourth control means dependent upon their relative magnitudes.

42. The control of claim 41 wherein said third control means comprises a valve for controlling circulating fluid between said condensor and said cooling tower.

43. The control of claim 42 wherein said fifth control means comprises a valve for controlling the supply of fuel of heat said hot water.

44. The control of claim 43 wherein said fourth control means comprises a reversing relay for receiving said second output signal and for generating an override signal to said first and second override means.

* * * * *